Oct. 28, 1952. G. S. HURST 2,616,052
FAST NEUTRON DOSIMETER
Filed Feb. 7, 1951 2 SHEETS—SHEET 1

INVENTOR.
George S. Hurst
BY
Roland A. Anderson
ATTORNEY

Oct. 28, 1952 G. S. HURST 2,616,052
FAST NEUTRON DOSIMETER

Filed Feb. 7, 1951 2 SHEETS—SHEET 2

INVENTOR.
George S. Hurst
BY
Roland A. Anderson
ATTORNEY

Patented Oct. 28, 1952

2,616,052

UNITED STATES PATENT OFFICE 2,616,052

FAST NEUTRON DOSIMETER

George S. Hurst, Oak Ridge, Tenn., assignor to the United States of America as represented by the United States Atomic Energy Commission Application February 7, 1951, Serial No. 209,749

6 Claims. (Cl. 250—83.6)

The present invention relates to radiation measurement, and more especially to an improved method and apparatus for determining the amount of energy that will be absorbed by a particular type of living cell by the incidence upon that cell of fast neutrons, over a broad spectrum of energies.

The amount of damage done to a living cell by incident neutrons depends in part upon the total amount of energy absorbed by the cell and the distribution of the ionization produced therein. Accordingly, the amount of energy absorbed per gram of animal tissue is taken as a measure of radiation "dosage." The unit of dosage measurement, called the "rep" (Roentgen-equivalent-physical), is defined as that amount of radiation which is absorbed in tissue to the extent of 95 ergs per gram of tissue.

Alpha and beta particles may ionize atoms of tissue directly, while gamma rays produce secondary electrons which ionize the tissue. Fast neutrons collide elastically with hydrogen, nitrogen, carbon, and oxygen atoms; the maximum amount of energy being transferred to the lighter hydrogen nuclei, or recoil protons. These particles lose their energy in the tissue by excitation and ionization. Considering the effect only of the first collision of a neutron, it has been determined that the dose received per neutron per cm.$^2$ of tissue varies with the neutron energy $E$ as the quantity: $E\Sigma_i \sigma_i f_i Q_i$ where $\sigma_i$=the scattering cross section of the $i$th kind of atom;

$f_i$=the average fractional loss of energy per collision with the $i$th kind of atom;

$Q_i$=the quantity per unit volume of the $i$th kind of atoms; and the summation is taken for hydrogen, oxygen, carbon, and nitrogen.

In the past, fast neutron dose has been inferred from the current produced in a special ion chamber having all its walls lined with a solid hydrogenous material and its volume filled with a gas containing hydrogen in the same proportion as the wall coating. However, the current due to the gamma rays which almost invariably accompany a fast neutron beam cannot be eliminated in such integrating devices, so an additional ion chamber, sensitive only to gamma radiation, is customarily provided, and the gamma-induced current therein is subtracted from the neutron-plus gamma induced current in the first chamber. In operation, such devices are cumbersome, have twice as many components to build, and maintain as single chambers, and, more important, may be inaccurate unless great care is taken to expose each chamber to the same gamma flux.

With a knowledge of the shortcomings of the dosimeters of the prior art, I have as a primary object of my invention the provision of a novel method of and apparatus for measuring the dosage, or energy absorbed in tissue from fast neutrons.

Another object of my invention is to provide a novel method of and apparatus for measuring the fast neutron dosage to tissue in the presence of gamma radiation.

Yet another object of my invention is to provide a novel recoil proportional counter system which will determine the dosage to human tissue from irradiation with a fast neutron beam.

An additional object of my invention is to provide a proportional counter comprising a hydrogenous solid wall of a predetermined composition and thickness and a hydrogenous filling gas, wherein the composition and thickness of the wall, the length of the counter, and the composition and pressure of the gas are related in an especial, predetermined manner such that the counting response of the detector is a measure of the fast neutron dose to tissue.

Still another object of my invention is to provide a method of and apparatus for measuring fast neutron dosage in the presence of gamma radiation with but a single counter, and without the necessity for complicated electronic circuitry, by a counting rate method.

Other objects and advantages of my invention will be apparent from the following detailed description of a preferred embodiment thereof, when read with reference to the appended drawings, in which.

Figure 1:
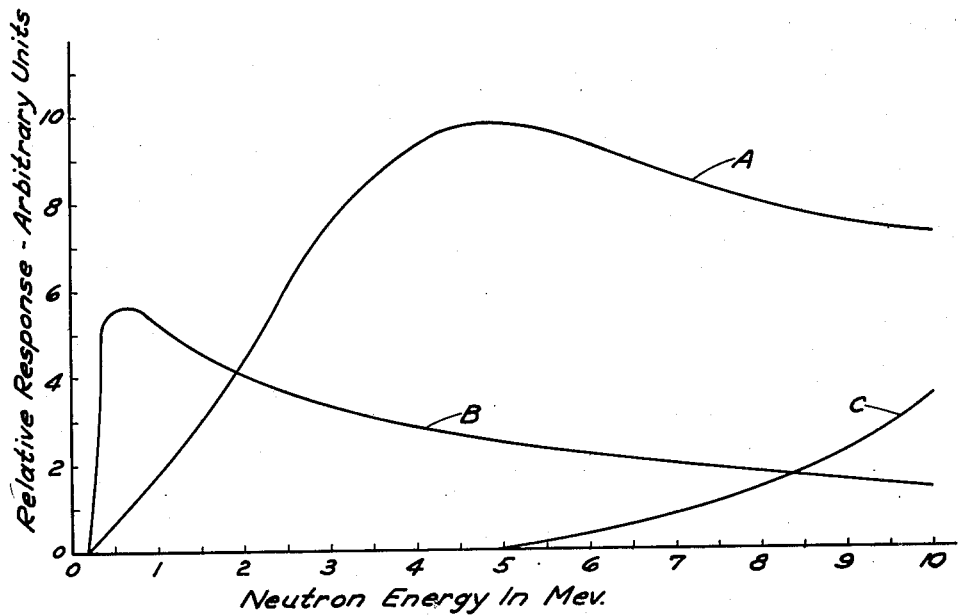
Figure 1 is a curve showing the relative response, in arbitrary units, of a plane slab of paraffin, a thick paraffin slab backed by aluminum, and a hydrogenous gas, to neutrons over an energy spectrum of ten million electron volts.

Referring now to Figure 1, curve A shows the calculated response of a plane slab of hydrogenous material to a collimated beam of fast neutrons over the energy spectrum up to 10 m. e. v. The number of proton recoils caused by the neutron beam in an incremental thickness $\Delta t$ is determined by the area of the slab $A_1$, the number $Q$ of hydrogen atoms per unit volume of the material, and the scattering cross-section $\sigma(E)$ of hydrogen. Of the protons originating at a depth $t$ below the surface of the slab, only a fractional part $F(t, E, B)$ reach the surface with a minimum residual energy $B$, which is assumed to be the minimum energy that will be detected in the counter. Therefore, the number $\Delta N_1$, or protons originating in an incremental thickness $\Delta t$ which will be counted is:

$$\Delta N_1 = A_1 Q \sigma(E) F(t, E, B) \Delta t \quad (1)$$

If the neutron-proton scattering is assumed to be isotropic, then it may be shown that $$F(T, E, B) = \sin^2 \theta \quad (2)$$

where $\theta(t, E, B)$ is the angle with the normal to the surface which the proton path must make if the particle is to reach the surface with an energy $B$.

Assuming now that the range $R$ of protons in the solid is:

$$R = K_1 E_p{}^n \quad (3)$$

where $E_p$ is the energy of the proton, and $K_1$ and $n$ are constants, then $$t = K_1 (E_\theta{}^n - B^n) \cos \theta \quad (4)$$

where $E_\theta$, the energy of a proton traveling at the angle $\theta$ with the normal to the surface, is related to the neutron energy $E$ by $$E_\theta = E \cos^2 \theta \quad (5)$$

The number of protons detected per unit time is then $$N_1(E) = A_1 Q \sigma(E) \int_0^t \sin^2 \theta(t, E, B) dt \quad (6)$$

Carrying out the integration above, where $t$ is either the actual slab thickness or the function defined by $$t = K_1 [E^n - B^n] \quad (7)$$

whichever is smaller, we obtain the expression:

$$N_1 = A_1 Q K_1 \sigma(E) \left\{ \frac{2 E^n}{2n+3} + B^n \left[ \frac{4n}{6n+9} \times \left(\frac{B}{E}\right)^{\frac{3}{2}} - \frac{2}{3} \right] \right\} \quad (8)$$

where $E \leq E_1$, and $E_1$ is defined as the minimum energy of a proton originating at the back of the slab and emerging at the front with an energy $B$. That is:

$$E_1 = \left[ \left(\frac{t_1}{K_1} + B^n\right)^{\frac{1}{n}} \right] \quad (9)$$

If $E > E_1$, then:

$$N_1 = A_1 Q K_1 \sigma(E) E_1{}^n \left[ 1 - \frac{2n+1}{2n+3} \left(\frac{E_1}{E}\right)^{\frac{2n}{2n+1}} \right] \quad (10)$$

Equation 9 is approximate, and holds if $E_1 \gg B$.

The response of a plane paraffin slab to fast neutrons, calculated from Equations 8 and 10, and assuming $E_1 = 3$ m. e. v. and $B = 0.2$ m. e. v., is shown in curve A. It is apparent from a comparison of this curve with curve D, Figure 4, that a simple proton recoil counter containing only the conventional thin hydrogenous proton radiator will not respond to the spectrum of neutrons in the same manner as does tissue. Rather the response of such counters falls off at the high energy end of the neutron energy spectrum and rises much too slowly in the lower energy portion, so that reliable dosage measurements over any appreciable part of the spectrum could not, in the prior art be correlated with counting of proton recoils.

However, in the face of this seeming impasse, I have found that I can, by certain novel arrangements and improvements, provide an accurate fast neutron dosimeter. First, I employ for my counting gas in the detector a hydrogen-bearing gas at a selected pressure so that the chamber contains only a certain predetermined number of hydrogen atoms per unit volume; second, I provide an additional thick hydrogenous proton radiator or slab, the inside surface (away from the source of neutrons) of which is covered by a thin metal absorber foil; and third, I measure dosage as a function of the rate of occurrence of pulses within the detector, rather than the integrated ion current, as has been heretofore done in ion chambers and the like.

If the number of protons scattered by unit neutron flux incident upon a volume containing $C$ hydrogen atoms is represented by $C\sigma(E)$, the fractional part that recoils with an energy not less than $B$ will be $[1 - B/E]$. The response $N_2$ of a counter filled with the gas is then:

$$N_2 = C\sigma(E)[1 - B/E] \quad (11)$$

Curve B of Figure 1 illustrates that response, assuming $B = 0.2$ m. e. v.

It may be similarly shown that the response $N_3$ of a thick slab of paraffin, to the back of which is placed an aluminum foil, to fast neutrons is:

$$N_3 = A_3 Q k_1 \sigma(E) E^n \left\{ \left(1 - \frac{2n+1}{2n+3} - \left(\frac{E_3}{E}\right)^n + \frac{2n+1}{2n+3}\left(\frac{E_3}{E}\right)^{\frac{n(2n+3)}{(2n+1)}} \right) \right\} \quad (12)$$

provided $$E > E_3, \quad E_3 \gg B, \text{ and } E_3 = (t_3/k_3)^{1/n} \quad (13)$$

where $t_3$ is the thickness of the foil,
$A_3$ is the area of the radiator,
$K_3$ is a constant relating the range in the foil of protons to their energy $(E_p)^n$.

Equation 12 is plotted as curve C, Figure 1.

Figure 4:
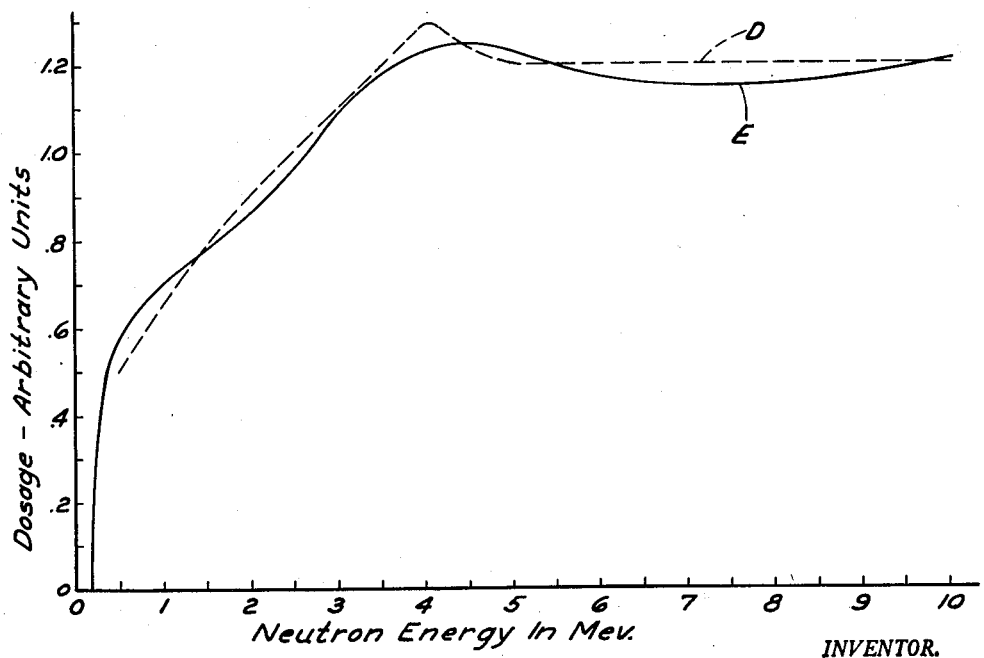
Figure 4 illustrates in curve D the relationship of first collision fast neutron tissue dosage to the energy of incident neutrons up to ten million electron volts (10 m. e. v.) and in curve E, the calculated response of the novel dosimeter described hereinafter.

Curve D, Figure 4, shows how the dose to tissue per unit neutron flux varies with fast neutron energy. Curve E, plotted also in Figure 4, shows the response in counting rate of my dosimeter, and how, by combining the counts available from a plane hydrogenous slab, a predetermined number of gaseous atoms, and a metal-backed thick hydrogenous slab in one proportional counter, I have provided an instrument, the response of which to fast neutrons is in very close agreement with the dose to tissue over the entire neutron spectrum from .3 m. e. v. to 10 m. e. v.

In plotting curve E, both the loss of counts due to wall effects and the contributions from carbon recoils from methane counter gas, which are minor effects under most conditions and effect the count in opposite directions, have not been considered.

Figure 2:
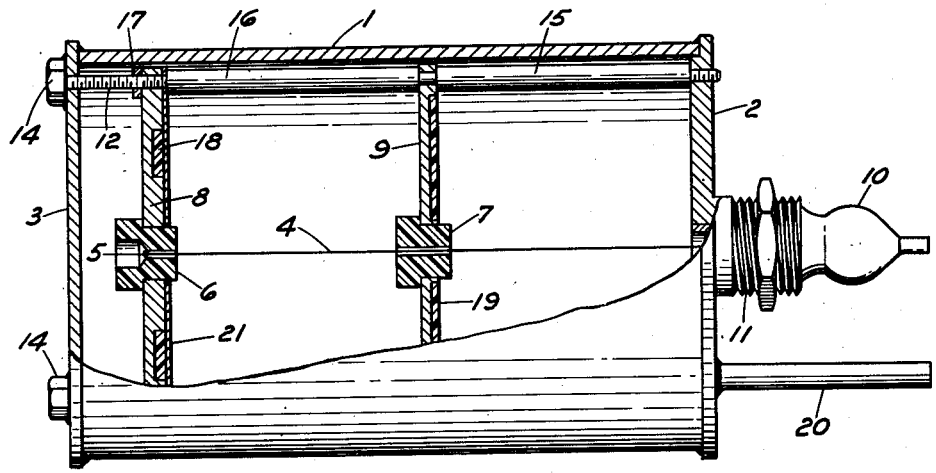
Figure 2 shows a sectional view of a novel counter constructed according to the teachings of my invention.

Referring now to Figure 2, a counter constructed according to the teachings of my invention may comprise a brass cylinder 1, closed at opposite ends by brass plates 2, 3. Center wire 4, a 0.001 inch diameter stainless steel wire, is beaded at one end 5, extends through teflon insulators 6, 7, which are force fitted into holes in the center of plates 8, 9, respectively, extends through threaded neck 11, and is soldered to the outer end of the Kovar seal 10 to form a vacuum-tight joint. Three threaded brass rods 12, one of which is shown in the figure, are spaced 120° apart within the outer shell 1, engaging correspondingly threaded holes in end plates 2, 3. Nuts 14 may be tightened to insure a gas-tight fit between the end plates and the outer shell. Plates 8, 9 are carried upon the three rods 12, and are maintained in spaced relation by hollow spacers 15, 16, and nuts 17, also carried on rods 12.

Plate 8 is a brass disc 1.844″ in diameter and 0.070″ thick, having a 0.250″ diameter hole in the center to receive insulator 6, three .070″ holes around the periphery to receive the rods 12, and an annular slot or counterbore 0.235″ wide and 0.055″ deep, the center line of the slot being 0.592″ radially from the center of the plate. The slot is filled with paraffin 18, until the surface of the paraffin is flush with that of the plate. The entire plate is covered with an aluminum foil 21, weighing 50 milligrams/cm.$^2$.

Plate 9 is of the same diameter as that plate, carries three similar 0.070″ holes around its periphery 120° apart, and has a center hole 0.250″ in diameter. But it is only 0.050″ in thickness, and carries a much wider and shallower annular counterbore than that in plate 8. The counterbore is 0.0055″ deep and 0.696″ wide, and its center-line is 0.588″ from the center of the plate. It is also filled with paraffin 19 until flush with the surface of the plate. A thin conducting coating such as carbon in the form of Aquadag, having electrical resistance of, preferably, one megohm or less, is sprayed over the entire surface of paraffin 18.

The plates 8 and 9 are disposed 3.5 cm. apart within the counter shell. By judicious choice of dimensions and pressure of the filling gas, protons produce in the counter pulses many times larger than the largest gamma-induced pulses, so that the gamma pulses may be discarded by a simple electronic discriminator, as shown hereinafter.

Plates 2, 3 are soldered to shell 1, and nuts 14 are soldered in place to plate 3 to make the counter vacuumtight. The counter should then be evacuated for several days to a pressure of $10^{-5}$ mm. Hg or lower, and filled thereafter with 13.2 cm. Hg of purified methane and 30.0 cm. Hg of argon through filling tube 20. The tube should then be crimped, the open end soldered over, and the counter removed from the vacuum system.

Hydrogen or an hydrocarbon is preferred for the counting gas. Argon is added to the counter to increase proton pulse size, yet the gamma-produced pulses are kept below threshold level. Paraffin and the $(CH_2)N$ plastics are preferred hydrogenous proton radiators. The area of the hydrogenous slabs may be chosen to fit the particular application; for example, for a small survey meter detector like that shown in Fig. 2, the area of the thin annular slab 19 may be arbitrarily decided upon. Then the contribution to the counting rate of the slab alone may be determined for the entire spectrum of energies, assuming values of $2.6 \times 10^{-3}$ for $K_1$, 1.72 for $n$, 3 m. e. v. for $E_1$, and .02 m. e. v. for $B$ in Equations 8 and 10. The choice of values for $E_1$ and $B$ also determine the thickness of the slab, as may be seen from Equation 9; i. e., the slab thickness in which a 3 m. e. v. proton will be slowed to 0.2 m. e. v.

The size of the detector chamber may also be chosen somewhat arbitrarily. In choosing chamber length, the energy lost by a gamma-produced electron having a range equal to the diagonal of the chamber, should be kept lower than the energy give up by the lowest energy protons which are to be measured. In choosing the gas pressure, the contribution to the overall counting rate which is desired from the filling gas determines selection of the desired number of hydrogen atoms C, Equation 7, which, together with the chamber volume, determines the required pressure.

As may be seen from curve C, Figure 1, the thick paraffin slab adds to the counter response above 5 m. e. v. Therefore, the slab thickness is chosen greater than the range of a 10 m. e. v. proton, determined from Equation 3. The thickness of the metal foil desired is that required to stop all protons having energies 5 m. e. v. or less, and may be determined from Equation 13. The area of the thick radiator is determined by the magnitude of the contribution to counting rate desired, and the optimum value for this area has been determined to be 34% the area arbitrarily chosen for the thin radiator.

Figure 3:
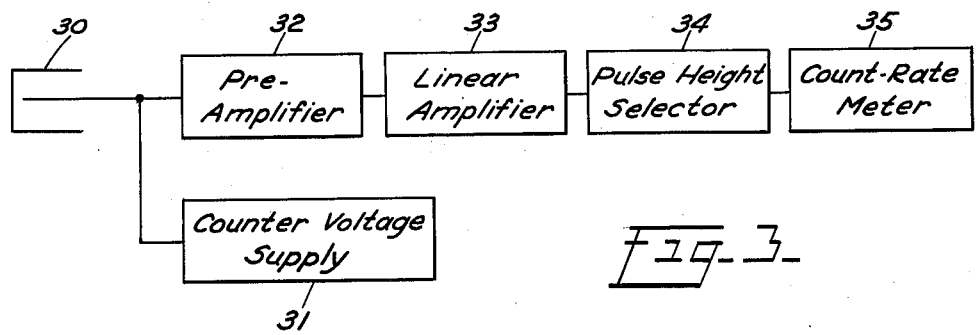
Figure 3 illustrates in block form one preferred embodiment of a complete counter system utilizing the counter of Figure 2.

One advantage of my detector is that it may be readily combined with simple commercially available electronic components to form a counting system. Figure 3 shows in block form a system including a preferred form of my novel detector with which fast neutron dosage to tissue can be measured, even in the presence of gamma radiation. The counter 30 is energized by a source of counter voltage 31, which may furnish 1300 volts D. C. Pulses occurring in the counter are amplified in pre-amplifier 32, which may be the A-1-B device described by Bell and Jordan in Rev. Sci. Instruments 18, 10 (1947), and are further amplified in linear amplifier 33, a preferred form of which is described in the same article. Pulse height discriminator 34, which may also be of the type described by Bell and Jordan, supra, allows only pulses above a selected bias voltage to enter count-rate meter 35, where the number of pulses per unit time may be counted, indicated, and/or recorded. The rate meter, which may be of any conventional type, operates an indicator calibrated in "rep," to indicate dosage directly. A bias of 19 volts on discriminator 35 has given very close agreement between experimental response and calculated dosage curves, when the counter is exposed to monoenergetic neutron beams of various energies.

Such elaborate electronic components are not necessary or desirable in a portable survey meter. Rather a simple three-stage D. C. amplifier of conventional design, accompanied by a single-stage discriminator and a simple count-rate circuit are preferred. The power supply for detector and electron tubes may be furnished by batteries and/or electronic supplies, as is conventionally done.

Nor is the design of my detector limited to the dimensions given in connection with Figure 2, or to the double-chambered tube there shown. Single chambered detectors are also good dosage measuring devices, though not so sensitive as the twin-chambered ones. In a single chamber design, a thin slab of paraffin may form one end wall of a cylindrical chamber 5 cm. in diameter and 3.5 cm. long. The outside plane surface of the paraffin is covered with aluminum foil, and a cylindrical slab of thick paraffin is placed on the other side of the foil. The inner slab might, for example, weigh 13 mg./cm.$^2$, the thick slab might be 100 mg./cm.$^2$, the foil may be 29 mg./cm.$^2$, the methane gas be admitted to 30 cm. pressure, and the ratio of diameter of the thin slab to that of the thick slab may be 5.4, in accordance with the above teachings.

It will be apparent to those skilled in the art that I have provided a novel counter particularly adapted to measure and indicate the dose to tissue from fast neutrons, and that I have further provided a counting system incorporating my novel counter tube with which I can measure neutron-induced dosage independently of gamma ray induced counting inaccuracies. By providing a proportional counter having two hydrogenous radiators: a thick ring at least as thick as the maximum proton recoil range in paraffin and a thin disc of specified dimensions, the areas of the two radiators being critically related; a predetermined number of hydrogen atoms per unit volume of filling gas; a metallic foil; and means for pulse-height selection, I can determine by direct measurement of fast neutron flux substantially the radiation dosage to tissue which would result from that flux.

Having described a preferred embodiment of my invention in detail, I claim:

1. A fast neutron dosimeter comprising a cylindrical shell, an electrode disposed axially thereof, a pair of end plates closing said shell, first and second shelf members provided with respective annular counterbores disposed within said shell in spaced relationship, first and second annular plane hydrogenous slabs disposed in the respective counterbores, a metallic sheet substantially covering the first of said slabs, an hydrogen-bearing gas disposed within said shell, the thickness and composition of said metal sheet being such that substantially all protons recoiling from neutrons of less than substantially 5 million electron volts will be absorbed by said sheet, the thickness and composition of said second slab, the areas of said slabs, and the pressure of said gas being so related that the response of said detector varies with the energy of said neutrons as does the quantity $E\Sigma_i \sigma_i F_i Q$ where $E$ is the energy of one of said neutrons;
$\sigma_i$ is the scattering cross-section of the $i$th kind of atom in tissue;
$F_i$ is the average fractional loss of energy per neutron collision with the $i$th kind of atom;
$Q$ is the number per unit volume of the $i$th kind of atom, and the summation is taken for hydrogen, oxygen, carbon, and nitrogen atoms in proportion as they occur in tissue.

2. A fast neutron dosimeter comprising an envelope defining all save one wall of a counter chamber, an electrode disposed axially within said envelope, an hydrogen-bearing counter-filling gas, a first plane hydrogenous slab forming said one wall, one surface of a metallic sheet disposed adjacent the outside of said one wall, and a second plane hydrogenous slab of substantially greater thickness and smaller surface area than said first slab disposed adjacent the reverse surface of said sheet.

3. A fast neutron dosimeter comprising a gas-tight cylindrical envelope, a wire disposed axially thereof, first and second shelves disposed in spaced relation within said cylinder and substantially perpendicular to the axis thereof, a first hydrogenous slab having one plane surface coated with a thin conductive coating disposed obverse surface to said first shelf, a second hydrogenous slab of greater thickness, smaller surface area, and substantially equal hydrogen content relative to said first slab carried by said second shelf, a metal absorber foil carried by said second slab, an hydrogen-bearing gas disposed within said envelope, and conductive means for connecting a source of potential between said wire as one electrode and said coating and said foil as respective opposite polarity electrodes of the two counters formed within said envelope.

4. A neutron dosimeter which responds to fast neutrons substantially as does the dosage rate to human tissue comprising a proportional counter including an outer shell electrode and an axial electrode; a first hydrogenous slab of thickness substantially equal to the range of a 3 m. e. v. neutron therein forming one wall of said counter; a metal foil disposed on the outside surface of said slab; a second hydrogenous slab thicker than the range of a 10 m. e. v. neutron therein disposed parallel to first slab on the opposite side of said metal foil; an hydrogenous counter-filling gas; the surface areas of said slabs and the pressure of said gas being so related that the number of recoil protons ejected at greater than a selected minimum energy within said gas by said neutrons varies with the energy E of incident neutrons as does the quantity $E\Sigma_i \sigma_i F_i Q$, where $\sigma_i$ is the scattering cross section of the $i$th kind of atom in human tissue, $F_i$ is the average fractional loss of energy per neutron collision with the $i$th atom, $Q$ is the number per unit volume of the $i$th kind of atom, and the summation $\Sigma_i$ is taken for hydrogen, carbon, oxygen, and nitrogen atoms in relative proportion as they occur in human tissue.

5. A neutron dosimeter which responds to fast neutrons substantially as does the dosage rate to human tissue comprising a proportional counter including an outer shell electrode and an axial electrode; a first hydrogenous slab of thickness substantially equal to the range of a 3 m. e. v. neutron therein forming one wall of said counter; a metal foil disposed on the outside surface of said slab; a second hydrogenous slab thicker than the range of a 10 m. e. v. neutron therein disposed parallel to first slab on the opposite side of said metal foil; an hydrogenous counter-filling gas; the surface areas of said slabs and the pressure of said gas being so related that the number of recoil protons ejected at greater than a selected minimum energy within said gas by said neutrons varies with the energy E of incident neutrons as does the quantity $E\Sigma_i \sigma_i F_i Q$, where $\sigma_i$ is the scattering cross section of the $i$th kind of atom in human tissue, $F_i$ is the average fractional loss of energy per neutron collision with the $i$th atom, $Q$ is the number per unit volume of the $i$th kind of atom, and the summation $\Sigma_i$ is taken for hydrogen, carbon, oxygen, and nitrogen atoms in relative proportion as they occur in human tissue, a power source for energizing said counter electrodes; a pulse amplifier connected to said counter electrodes; a pulse height selector adapted to pass only those pulses from said amplifier of magnitude greater than that corresponding to the selected bias energy; and means for counting the rate of occurrence of said pulses passed by said selector, said rate being a measure of dosage rate to human tissue.

6. A neutron dosimeter comprising a cylindrical shell; an axial electrode; first and second shelf members provided with respective annular counterbores and disposed in spaced relation within said shell; first and second annular hydrogenous slabs disposed in said respective counterbores; a metallic foil covering said first slab; an hydrogenous gas disposed within said shell; and a thin, proton-pervious conductive coating disposed on the exposed surface of said second slab; the thickness of said first slab being greater than the range of a 10 m. e. v. neutron therein, the thickness of said second slab being substantially the range of a 3 m. e. v. neutron therein, the thickness of said foil being of substantially the range of the 5 m. e. v. proton therein, the surface area of said first slab being substantially .34 times that of said second slab, the counter volume and the pressure of said gas therein being so related as to provide a predetermined number of hydrogen molecules in said counter.

GEORGE S. HURST.

REFERENCES CITED

The following references are of record in the file of this patent:

UNITED STATES PATENTS

| Number | Name | Date |
|---|---|---|
| 2,186,757 | Kallmann et al. | Jan. 9, 1940 |
| 2,376,196 | Scherbatskoy | May 15, 1945 |
| 2,493,935 | Wiegand et al. | Jan. 10, 1950 |
| 2,499,830 | Molloy | Mar. 7, 1950 |
| 2,519,007 | Wilson | Aug. 15, 1950 |

OTHER REFERENCES

"The Design of Neutron Counters Using Multiple Detecting Layers," Lowde, Rev. of Sci. Inst., vol. 21, No. 10, October 1950, pages 835–841.